United States Patent
Jansen

(10) Patent No.: US 9,630,360 B2
(45) Date of Patent: Apr. 25, 2017

(54) METHOD AND APPARATUS FOR PRODUCING A PLASTIC PROFILE HAVING A REINFORCEMENT

(75) Inventor: Klaus Jansen, Buxtehude (DE)

(73) Assignee: Thomas GmbH+Co. Technik+Innovation KG, Bremervörde (DE)

( * ) Notice: Subject to any disclaimer, the term of this patent is extended or adjusted under 35 U.S.C. 154(b) by 614 days.

(21) Appl. No.: 14/005,716

(22) PCT Filed: Mar. 15, 2012

(86) PCT No.: PCT/EP2012/001159
§ 371 (c)(1),
(2), (4) Date: Jan. 10, 2014

(87) PCT Pub. No.: WO2012/130396
PCT Pub. Date: Oct. 4, 2012

(65) Prior Publication Data
US 2014/0117581 A1    May 1, 2014

(30) Foreign Application Priority Data
Mar. 30, 2011 (DE) .................. 10 2011 015 607

(51) Int. Cl.
*B29C 55/30* (2006.01)
*B29C 70/52* (2006.01)
(Continued)

(52) U.S. Cl.
CPC ............ *B29C 55/30* (2013.01); *B29C 70/521* (2013.01); *B29C 70/526* (2013.01);
(Continued)

(58) Field of Classification Search
CPC ..... B29C 70/52; B29C 70/521; B29C 7/5222; B29C 7/523; B29C 70/524; B29C 70/525;
(Continued)

(56) References Cited

U.S. PATENT DOCUMENTS 3,053,717 A * 9/1962 Bright ................ B29C 70/16
156/177
3,890,925 A * 6/1975 Roberson ............ B29B 15/125
118/104
(Continued)

FOREIGN PATENT DOCUMENTS

EP    0747204 A2    12/1996
EP    1547753 A1    6/2005
(Continued)

*Primary Examiner* — Jeffrey Wollschlager
(74) *Attorney, Agent, or Firm* — Laurence P. Colton; Smith Tempel Blaha LLC

(57) ABSTRACT

In the pultrusion of reinforced plastic profiles in strand form, the strands of the reinforcement are brought together in a positioning device and subsequently embedded in the plastic. The pulling of the strands of the reinforcement through the positioning device leads to an unwanted contraction and uncontrolled positioning of the reinforcement in the plastic profile. The invention envisages forming the positioning device by multiple successive positioning means, of which at least some positioning means can be periodically moved forward in the direction of production and also moved back counter to the direction of production. As a result, there is an alternating tensioning and compression of individual regions of the reinforcement. This makes exact positioning of the reinforcement in the plastic profile possible and prevents contraction of the reinforcement.

11 Claims, 3 Drawing Sheets

(51) Int. Cl.
*B29C 70/56* (2006.01)
*B29C 70/54* (2006.01)

(52) U.S. Cl.
CPC .......... *B29C 70/523* (2013.01); *B29C 70/525* (2013.01); *B29C 70/528* (2013.01); *B29C 70/541* (2013.01); *B29C 70/543* (2013.01); *B29C 70/56* (2013.01)

(58) Field of Classification Search
CPC ... B29C 70/526; B29C 70/527; B29C 70/528; B29C 70/541; B29C 70/543; B29C 70/56; B29C 55/30
See application file for complete search history.

(56) References Cited

U.S. PATENT DOCUMENTS

| | | | | |
|---|---|---|---|---|
| 3,992,240 | A * | 11/1976 | Kuehn, Jr. | B29C 70/525 156/250 |
| 4,445,957 | A | 5/1984 | Harvey | |
| 4,481,056 | A * | 11/1984 | Kuhl | B29C 70/522 156/180 |
| 4,532,169 | A * | 7/1985 | Carley | B29C 53/8016 156/161 |
| 4,601,932 | A * | 7/1986 | Steel | B29C 70/083 428/105 |
| 4,790,898 | A * | 12/1988 | Woods | B29C 53/566 156/166 |
| 4,892,600 | A * | 1/1990 | Beever | B29C 70/521 156/166 |
| 5,096,645 | A * | 3/1992 | Fink | B29C 47/003 156/161 |
| 5,205,898 | A * | 4/1993 | Wilson | B29B 15/125 118/124 |
| 5,583,298 | A * | 12/1996 | Walsh | B29C 70/525 73/831 |
| 5,593,536 | A * | 1/1997 | Kaiser | B29C 70/081 156/180 |
| 5,624,082 | A * | 4/1997 | Ligon | B65H 49/16 139/450 |
| 5,637,270 | A * | 6/1997 | Amaike | B29C 70/504 264/136 |
| 5,747,075 | A * | 5/1998 | Gauchel | B29C 70/523 156/433 |
| 5,767,023 | A * | 6/1998 | Berger | B29C 70/24 139/384 R |
| 5,876,553 | A * | 3/1999 | Kaiser | B29C 70/525 156/180 |
| 2002/0056508 | A1 | 5/2002 | Brandstrom | |
| 2006/0137156 | A1* | 6/2006 | Kawabe | B29C 70/20 28/271 |
| 2007/0126140 | A1* | 6/2007 | Jansen | B29C 70/20 264/103 |
| 2010/0035017 | A1* | 2/2010 | Green | B29C 47/0014 428/114 |
| 2011/0049750 | A1* | 3/2011 | Bechtold | B29C 69/001 264/177.1 |

FOREIGN PATENT DOCUMENTS

| | | |
|---|---|---|
| GB | 780677 A | 8/1957 |
| WO | 9620824 A1 | 7/1996 |

* cited by examiner

METHOD AND APPARATUS FOR PRODUCING A PLASTIC PROFILE HAVING A REINFORCEMENT

BACKGROUND OF THE INVENTION

Technical Field

The invention relates to a method for producing a plastic profile having a reinforcement, the reinforcement being passed uninterruptedly through a positioning device and a mold then following in the direction of production, and the plastic profile with the reinforcement embedded therein being pulled by a pulling device through the positioning device and the mold in the direction of production, or a method for producing a plastic profile having a reinforcement, the reinforcement with the plastic embedding the latter being passed through a mold in the direction of production. Furthermore, the invention relates to an apparatus for producing a plastic profile having a reinforcement, with a closed mold, completely surrounding the plastic profile, and at least one positioning device, for the reinforcement of the plastic profile arranged upstream of the mold in the direction of production of the plastic profile, or an apparatus for producing a plastic profile having a reinforcement, with a mold that brings the plastic profile with the reinforcement lying therein into the desired form.

Prior Art

Reinforced plastic profiles have an uninterrupted reinforcement of, in particular, fibers, woven, braided and/or knitted fabrics, which are embedded in the plastic as a matrix. The plastic may be a thermoset, or else a thermoplastic. Reinforced plastic profiles are mostly produced uninterruptedly, in particular continuously, in a strand. This takes place with preference by the extrusion or pultrusion process. In this case, the reinforcement is pulled through a positioning device and subsequently passed through a mold. In the mold, the reinforcement and the plastic are brought into the desired profile. The plastic profile leaving the mold is pulled off by a pulling device following the mold in the direction of production. In this case, the reinforcement is pulled through the positioning device and the plastic with the reinforcement embedded therein is pulled through the mold.

In the case of the previously known production of reinforced plastic profiles, the positionally exact introduction of a non-unidirectional reinforcement into the plastic is particularly problematical. The tensile forces exerted on the reinforcement by the pulling device lead to distortions of the non-unidirectional reinforcement, such as in particular woven, nonwoven and braided fabrics. This has the effect that the reinforcement does not have the desired positioning in the plastic profile to be produced. This applies in particular in the case of a reinforcement with a large fiber volume.

Furthermore, previously reinforced plastic profiles with a non-straight, in particular arcuate, shape are only possible with molds that are specifically adapted to the shape of the reinforced plastic profile to be produced.

BRIEF SUMMARY OF THE INVENTION

The invention is thus based on the object of providing a method and an apparatus whereby the reinforcement can be embedded exactly in the plastic profile to be produced and/or reinforced plastic profiles with various shapes can be produced with a universal mold.

A method for achieving at least a partial aspect of the object is a method for producing a plastic profile having a reinforcement, the reinforcement being passed uninterruptedly through a positioning device and a mold then following in the direction of production, and the plastic profile with the reinforcement embedded therein being pulled by a pulling device through the positioning device and the mold in the direction of production, characterized in that the reinforcement is pulled through a positioning device with at least two successive, separate positioning means and at least one positioning means is thereby moved in relation to at least one other. Accordingly, the reinforcement is pulled through at least two separate positioning means arranged following one another upstream of the mold, seen in the direction of production, at least one positioning means being relatively movable with respect to at least one other positioning means. Preferably, all of the positioning means that are separate from one another are movable in relation to one another. The relative mobility of at least one positioning means has the effect that preferably the reinforcement is compressed phase by phase and/or portion by portion as it is pulled through the positioning means, and is consequently not constantly exposed to tensile loading. This results in a snaking movement of the reinforcement through the positioning means, which has the consequence of momentarily relieving the reinforcement of loading region by region. Deformations or distortions of the reinforcement are thereby avoided, or at least reduced, which has the consequence of a controlled introduction of the reinforcement into the plastic. In this way, a reinforced plastic profile with a reinforcement distributed exactly over the cross section and positioned exactly in the cross section can be provided.

It is envisaged with preference to change periodically the distance between at least two positioning means following one another in the direction of production. In particular, this can take place by the at least one positioning means being movable back and forth alternately in the direction of production and counter to the direction of production in certain time intervals. As a result, the tensile loading of the reinforcement is lifted for a time alternately on opposite sides of the periodically moved positioning means. There is preferably even a brief compression of the reinforcement, pressed on one side and then on the other side of the periodically moved positioning means. As a result, distortions of the reinforcement, in particular transversely with respect to the direction of production of the plastic profile, are avoided or reduced. It is particularly advantageous if all of the positioning means are moved back and forth periodically at regular time intervals, preferably in a phase-offset manner. Then, various portions of the reinforcement are alternately at least relieved, preferably even for a short time compressed, in the region of the positioning means.

In the case of a preferred refinement of the method, it is envisaged to keep the reinforcement taut. This can take place by securely holding the reinforcement upstream of the first positioning means, for example by retarded unwinding of the reinforcement from a supply roll and by securely holding the produced reinforced plastic profile by the pulling device. Keeping the reinforcements taut achieves the effect that, when at least one positioning means is moved back counter to the direction of production, the reinforcement or else the entire plastic profile is not pulled back through the mold or pulling device counter to the direction of production. Furthermore, keeping the reinforcement taut has the effect that, when at least one positioning means is periodically moved back counter to the direction of production, the tensile stress in the portion of the reinforcement lying upstream of the positioning means that is moving back can be reduced, or possibly the reinforcement can be slightly compressed.

According to another advantageous refinement of the method, the reinforced strand of plastic is cooled in the pulling device. This also allows plastic profiles reinforced by the method to be produced from a thermoplastic material, because then the not yet completely cured plastic profile can leave the mold without the risk of the lateral surface of the plastic profile sticking to the molding surfaces of the mold.

It is particularly advantageous to press the reinforced plastic profile leaving the mold radially together in the pulling device. The pulling device may then serve for the final forming of the plastic profile, this final forming, or else calibration, of the plastic profile preferably taking place during the cooling of the same, and, as a result, the lateral surface of the plastic profile not being able to stick to the surfaces of the pulling device that come into contact with it.

In particular, the pulling device may be formed or developed such that it can be released from the circumference of the finished, in particular cooled, plastic profile. For example, this can take place by a multipart form of the pulling device, the individual parts of the pulling device being able to move apart, and thus demold the finished plastic profile in a practical manner. Conversely, when the individual parts of the pulling device are moved together, the plastic profile can be pressed, and the intended cross section can thereby be obtained exactly. Thus, a calibration of the plastic profile as it were takes place during the pressing of the plastic profile in the pulling device, to be precise preferably before the complete curing of the plastic profile.

According to an advantageous development of the method, it is envisaged not only to move at least one positioning means but also the mold, an impregnating unit and/or the pulling device periodically back and forth. In this case, the mold may be of one part, but may also be divided into a heating device, a gel zone region and a final reaction region.

Preferably, the periodic movement back and forth of the at least one positioning means, of the mold and/or of the pulling device takes place in a phase-offset or phase-shifted manner, so that the tensile loading on the reinforcement is not lifted uninterruptedly, but instead it is always the case that only certain portions of the reinforcement are relieved of loading, or even compressed, at different times one after the other or else partially at overlapping times. As a result, when the forces are applied to the reinforcement in the direction of production, and possibly partially also counter to the direction of production, when the plastic profile is being produced, there is a periodic change of load on different successive regions of the reinforcement between the pulling device and the first positioning means. These changes of load are comparable to a snaking movement.

An apparatus for achieving at least a partial aspect of the object mentioned at the beginning is an apparatus for producing a plastic profile having a reinforcement, with a closed mold, completely surrounding the plastic profile, and at least one positioning device, for the reinforcement of the plastic profile, arranged upstream of the mold in the direction of production of the plastic profile, characterized in that the positioning device has multiple successive positioning means, at least one positioning means being movable back and forth in relation to at least one other positioning means. Accordingly, multiple successive positioning means are provided and at least one positioning means is movable in relation to the at least one other positioning means. If the movable positioning means is momentarily moved back counter to the direction of production on the reinforcement, it "swallows up" as it were a portion of the reinforcement, whereby the tensile loading of this region of the reinforcement is momentarily lifted, or there is even a brief portion-by-portion compression of the reinforcement. Thus, according to the invention, a deformation, in particular contraction, of the reinforcement is counteracted or a contraction of the reinforcement that has possibly occurred is reversed.

In the case of a preferred form of the apparatus, each positioning means is formed like an orifice plate. Alternatively or additionally, it is provided that each positioning means has a passage for the reinforcement and/or the size of the passages of the successive positioning means decreases in the direction of production. The orifice-plate-like positioning means leads to a bundling of the individual components of the reinforcement, for example multiple strands running through. The alternative or additional reduction in size of the passages of the successive positioning means has the effect that the bundling takes place stage by stage, by the reinforcement being reduced increasingly in cross section from one positioning means to the other. The increasingly smaller passages of the successive positioning means cause a gradual, positionally exact bundling of the individual components of the reinforcement, whereby a uniform distribution of force is produced in the reinforcement during the production of the plastic profile.

An advantageous refinement of the apparatus provides that each positioning means that can be moved back and forth is periodically movable independently of the other positioning means. This movement of the respective positioning means may be performed by a drive or an actuator, it being preferred for each movable positioning means or groups of multiple positioning means to be assigned a drive or actuator of its or their own. The drives or actuators allow an individual movement of the positioning means along the direction of production of the reinforced plastic profile. In particular, they allow an independent or specifically coordinated sequence of the movements of the positioning means if multiple movable positioning means are provided.

It is also provided with preference that at least one pulling device that can be periodically moved back and forth follows the mold in the direction of production, the pulling device being provided in particular with a cooling arrangement and/or consisting of multiple gripper parts that can be moved together and apart and in the moved-together state completely grip around, preferably press together, the plastic profile to be produced. The pulling device thus has multiple functions. It not only serves for the discontinuous advancement of the reinforced plastic profile in the direction of production, but also for the cooling and/or pressing together of the plastic profile, whereby the latter is calibrated. An apparatus with such a pulling device is also suitable for producing the reinforced plastic profile from a thermoplastic material.

A further method for achieving at least a partial aspect of the object, which may also be a preferred development of the previously described method, is a method for producing a plastic profile having a reinforcement, the reinforcement with the plastic embedding the latter being passed through a mold in the direction of production, characterized in that the mold is formed by multiple mold portions following one another in the direction of production and respectively having a molding passage corresponding to the cross section of the plastic profile to be produced, the mold portions being displaced such that the longitudinal directions of the molding passages lie on the longitudinal center axis of the plastic profile to be produced and/or run tangentially with respect to the longitudinal center axis of the plastic profile to be produced to achieve a desired shape of the plastic profile. According to this, the mold is formed by multiple mold portions following one another in the direction of production, each mold portion having a molding passage corresponding to the cross section of the plastic profile to be produced. It is also envisaged to displace the mold portions as and when required such that longitudinal center axes or longitudinal directions of the molding passages in the mold portions lie on the longitudinal center axis of the plastic profile respectively to be produced or optionally run tangentially thereto. In this way it is possible with one and the same mold to produce plastic profiles with different shapes, in particular both straight and curved shapes.

Preferably, the molding portions are displaced in such a way that the inclinations of the longitudinal directions of the shaping passages change. Different inclinations of the longitudinal center axes of the molding passages of different mold portions allow a plastic profile that is curved in any way desired to be produced. The mold portions may however also be aligned such that the longitudinal directions or longitudinal center axes of their molding passages lie on an identical, straight line, in order to produce straight plastic profiles.

A preferred development of the method envisages displacing the mold portions in such a way that, in the case of plate-like mold portions, points of the longitudinal center axes of the molding passages that lie in the center of the plate lie on the longitudinal center axis of the plastic profile to be produced. Then, the straight or else non-straight shape of the plastic profile is fixed in the direction of production by these points of the longitudinal center axes of all the mold portions.

A further apparatus for achieving the object mentioned at the beginning, which may also be a preferred development of the previously described apparatus, is an apparatus for producing a plastic profile having a reinforcement, with a mold that brings the plastic profile with the reinforcement lying therein into the desired form, characterized in that the mold is formed by multiple mold portions following one another in the direction of production and having molding passages corresponding to the cross section of the plastic profile to be produced, and the size of each molding passage changes in the longitudinal direction of the same or in the direction of production of the plastic profile. In the case of this apparatus, the mold is formed by multiple mold portions following one another in the direction of production with molding passages corresponding to the cross section of the plastic profile to be produced, the size of the molding passage in each mold portion changing in the direction of production. Preferably, as a result the mold walls of the molding passages are convexly formed, so that the molding passages of the mold portions have a constriction in a plane running transversely with respect to the direction of production or the longitudinal axis of the plastic profile. As a result, the molding passage does not come into contact with the plastic profile to be produced over its entire length, but only at its narrowest point. As a result, a plastic profile can even be produced with tilted mold portions, to be precise then with a shape that is curved to a greater or lesser extent or is in some other way not straight, in particular of any desired shape, in dependence on the tilting of the mold portions.

BRIEF DESCRIPTION OF THE DRAWINGS

The inventions are explained in more detail below on the basis of the drawing, in which.

DETAILED DESCRIPTION OF PREFERRED EMBODIMENTS

Figure 1:
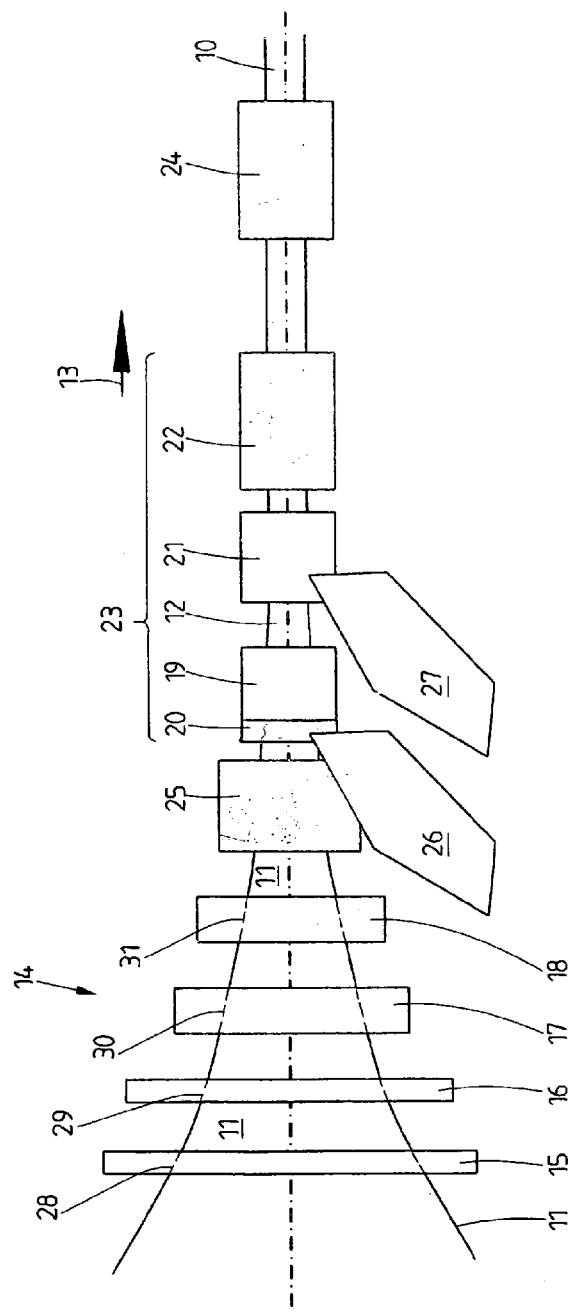
FIG. 1 shows a schematic side view of an apparatus for producing a reinforced plastic profile.

FIG. 1 shows the essential components of an apparatus for producing a reinforced plastic profile. This apparatus is a pultrusion apparatus for a plastic profile 10 with a reinforcement 11. The reinforcement 11 is completely embedded in a plastic 12, which may be both a thermoset and a thermoplastic.

The reinforcement 11 may be formed by a multiplicity of uninterrupted strands, but also a nonwoven, woven and/or knitted fabric. The reinforcement 11 may also consist of combinations of strands, nonwoven, knitted and/or woven fabrics. Preferably, the reinforcement 11 is formed by high-strength synthetic, glass and/or carbon fibers or strands.

The plastic profile 10 may have any desired cross sections. In the longitudinal direction, which corresponds to the direction of production 13 of the reinforced plastic profile 10, the plastic profile 10 may either run in a straight line, as represented in FIGS. 1 and 4, or else be arcuate, according to FIG. 3. In addition, the plastic profile 10 may have any other desired shapes in the longitudinal direction. The invention is therefore neither restricted to the cross section nor to the shape of the plastic profile 10. In particular, non-straight shapes of the plastic profile 10 may be both confined to one plane (two-dimensional) or else be three-dimensional.

The apparatus shown has multiple components following one another at a distance in the direction of production 13. At the beginning of the apparatus there is a positioning device 14 for the reinforcement 11. According to the invention, the positioning device 14 is formed by multiple positioning means following one another at a distance in the direction of production 13. The positioning device 14 shown is formed by four successive positioning means 15, 16, 17 and 18. However, the invention is not restricted to this. In the simplest case, the positioning device 14 need only have two positioning means, and it may also be formed by more than four positioning means 15, 16, 17, 18.

The positioning device 14 is followed in the direction of production 13 by an impregnating device 25, for feeding the liquid plastic 12 to the reinforcement 11 bundled in the positioning device 14, a heating device 19 with a cooled inlet 20 at the beginning, a gel zone region 21 and a final reaction region 22. The heating device 19 with the cooled inlet 20, the gel zone region 21 and the final reaction region 22 together form an annular, closed mold 23, surrounding the plastic profile 10, of the apparatus, for which purpose they may possibly be completely or partially combined to form a single unit or possibly also multiple units.

At a distance downstream of the final reaction region 22 of the mold 23, seen in the direction of production 13, there is a pulling device 24, which pulls the plastic profile 10 through the positioning device 14, the impregnating device 25 and the mold 23. The pulling device 24 also serves for keeping the reinforcement 11 taut during the entire operation of producing the plastic profile 10, by the individual component parts, for example strands, of the reinforcement 10 being subjected to a restraining force, acting counter to the holding force of the pulling device 24, of a device for unrolling the strands that is not shown in the figures.

In the case of the apparatus shown here, the impregnating device 25 is assigned a discharge device 26 for excess resin that is only schematically represented. A further discharge device 27 is assigned to the gel zone region 21. This discharge device 27 serves for discharging low-viscosity resin from the already initiated reaction.

In the case of the apparatus shown here, all four positioning means 15 to 18, the impregnating device 25, the individual components of the mold 23 and the pulling device 24 can be moved, in particular can be moved back and forth, in the direction of production 13 and counter to the direction of production 13 for a short time (periodically) at preferably regular time intervals. For this purpose, each positioning means 15 to 18, the impregnating device 25, the mold 23 and the pulling device 24 are particularly assigned a motion element that is not shown in the figures. This may be a reversible linear drive, the movement axis of which runs in the direction of production 13. It is also conceivable to bring about the back-and-forth movements of the positioning means 15 to 18, the impregnating device 25, the mold 23 and/or the pulling device 24 by actuators, for example piezos.

A conceivable alternative refinement of the apparatus envisages moving the mold 23 as a whole back and forth. Then, the individual components of the mold 23 carry out movements simultaneously. For this purpose, the mold 23 may be formed by components that are joined together and not spaced apart from one another, by the heating device 19, the gel zone region 21 and the final reaction region 22 following one another directly.

The individual positioning means 15 to 18 of the positioning device 14 are formed like orifice plates. For this purpose, each positioning means 15, 16, 17, 18 consists of a plate running transversely with respect to the direction of production 13. The plates may be of the same thickness, or else have different thicknesses—as in the exemplary embodiment shown—by the positioning means 17 and 18 being thicker than the positioning means 15 and 16, to be precise approximately twice as thick. Each of the plate-like positioning means 15 to 18 has a passage 28, 29, 30, 31. The reinforcement 11 is led through the passages 28, 29, 30 and 31 of the positioning means 15, 16, 18 in the direction of the impregnating device 25. The passages 28 to 31 of the individual positioning means 15 to 18 are of different sizes. In the direction of production 13, the passages 28 to 31 of the positioning means 15 to 18 become increasingly smaller. The first positioning means 15 in the direction of production 13 accordingly has the largest passage 28, while the last positioning means 18 before the impregnating device 25, seen in the direction of production 13, has the smallest passage 31. The orifice-plate-like form of the positioning means 15 to 18, with the passages 28 to 31 becoming increasingly smaller in the direction of production 13, has the effect that the reinforcement 11 is bundled by the positioning means 15 to 18 in the direction of production 13 and increasingly compacted, whereby, in the direction of production 13, the reinforcement 11 is brought together in a funnel-like manner in the direction of the impregnating device 25.

In the exemplary embodiment shown in FIG. 1, the positioning means 15 to 18 are spaced equally apart from one another. The intermediate spaces between successive positioning means 15 to 18 are approximately the same size. In the exemplary embodiment shown, the intermediate spaces between two respective positioning means 15 to 18 are approximately the thickness of the positioning means 17 or 18.

The pulling device 24 is formed such that it can be released from the finished plastic profile 10. For this purpose, the pulling device 24 has, for example, grippers that can be moved together and apart. When the pulling device 24 securely holds the plastic profile 10, it can be moved forward by the pulling device 24 in the direction of production 13. When the pulling device 24 is released from the plastic profile 10, the pulling device 24 can be moved back counter to the direction of production 13.

The pulling device 24 may possibly be provided with a cooling arrangement. The cooling arrangement of the pulling device 24 is provided in particular whenever it is intended to produce with the apparatus a plastic profile 10 in which the reinforcement 11 is embedded in a thermoplastic material 12. The pulling device 24 may be designed in particular for producing a plastic profile 10 from a thermoplastic material 12 and also for compressing the plastic profile 10 in the circumferential direction. Then, the demolding of the plastic profile 10 takes place in the compressible pulling device 24. This demolding takes place after a calibration of the plastic profile 10. For this purpose, the pulling device 24 may be dividably formed, by consisting of two or more parts, in particular press parts, that can be moved together and apart transversely with respect to the direction of production 13. With the press parts of the pulling device 24 moved together, there takes place a demolding under pressure or calibration of the plastic profile 10 surrounded all around by the press parts. With the press parts moved apart, the pulling device 24 is detached from the lateral surface of the plastic profile 10, whereby the pulling device 24 can be moved back counter to the direction of production 13 without contacting the lateral surface of the plastic profile 10.

Linear drives or actuators for moving the pulling device 24 forward and back are not represented in FIG. 1. Similarly, FIG. 1 does not include any representation of such drives or actuators for moving the gel zone region 21, the final reaction region 22 and the heating device 19 of the mold 23 and also the impregnating device 25. Such linear drives may be formed in a way known per se. The actuators may consist of piezos. The latter lead to relatively small traveling distances. By contrast, linear drives allow greater traveling distances, to be precise of any desired length.

The method according to the invention is described in more detail below with reference to FIGS. 1 and 2.

In the following description of the method, it is assumed that all four positioning means 15 to 18, the impregnating device 25, all parts of the mold 23 and the pulling device 24 can be moved back and forth in the direction of production 13 and counter to the direction of production 13 periodically by the same distance in each case, the movement of the positioning means 15 to 18, the impregnating device 25, the parts of the mold 23 and the pulling device 24 being phase-shifted. During the movement back and forth of the aforementioned movable parts of the apparatus, the reinforcement 11 is kept taut over the entire length.

Figure 2:
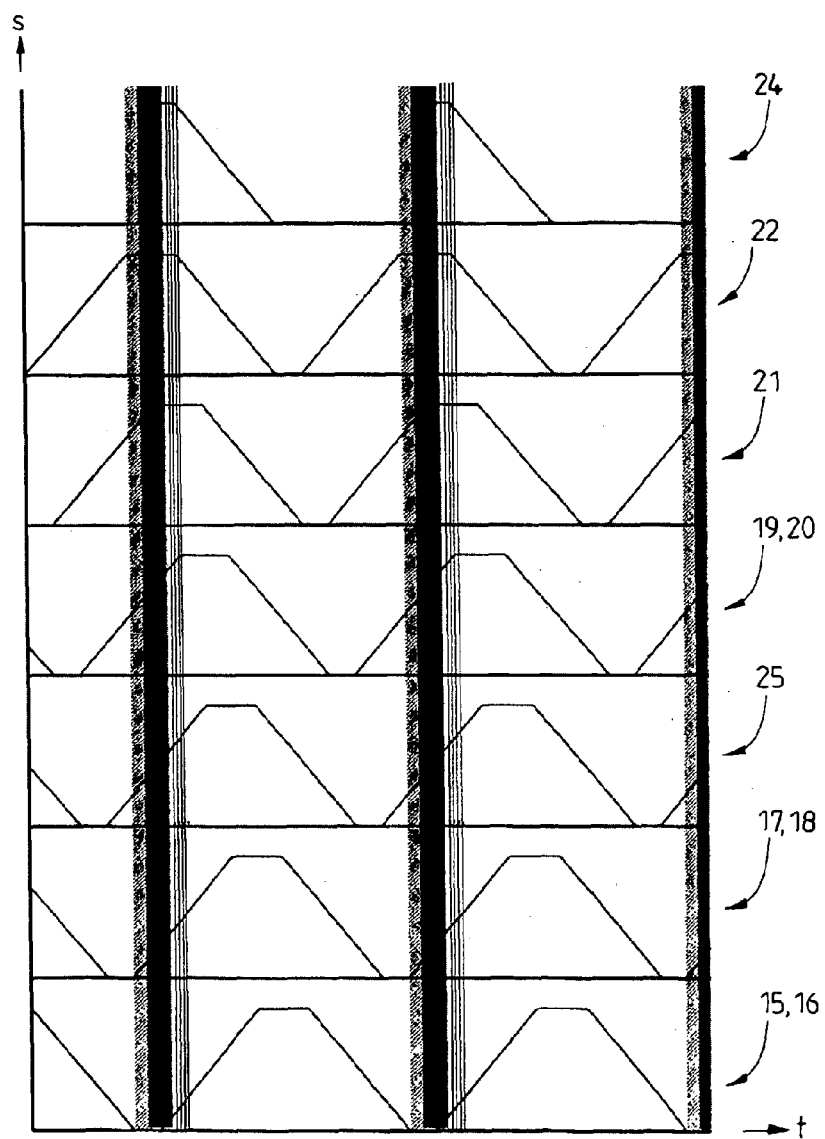
FIG. 2 shows a graphic representation of the sequence of movements over time of individual components of the apparatus of FIG. 1.

In FIG. 2, the sequences of movements are represented in a time-distance diagram. The time t is plotted on the x axis and the distance s is plotted on the y axis. In the case of the time-distance diagram shown here, it is assumed that the positioning means 15 and 16 on the one hand and the positioning means 17 and 18 on the other hand are moved simultaneously. In the time-distance diagram of FIG. 2, the sequences of movement of the positioning means 15 and 16, the positioning means 17 and 18, the impregnating device 25, the heating device 19 with the cooled inlet 20, the gel zone region 21, the final reaction region 22 and the pulling device 24 are represented one above the other from the bottom upward. The opening of the grippers of the pulling device 24 is represented in vertical regions. Following thereafter in time is the time period in which the grippers of the pulling device 24 are open, represented by a cross-hatched bar. Represented alongside by vertical hatching is the phase of the closing of the grippers. The (white) regions of a longer time between the vertical bars for the opening of the pulling device 24, the open pulling device 24 and the closing of the pulling device 24, represent time phases in which the grippers of the pulling device 24 are closed. Each of these time phases is greater by a multiple than the time phase in which the grippers of the pulling device 24 open, close and are open.

The direction of the distance s represented on the y axis in FIG. 2 corresponds to the movement of the individual components of the apparatus counter to the direction of production 13. Accordingly, a movement in the direction of the y axis that is represented in FIG. 2 concerns a movement counter to the direction of production 13 of the plastic profile 10.

Represented at the top in FIG. 2 is the sequence of movements of the pulling device 24. Accordingly, with its grippers open, the pulling device 24 moves relatively quickly counter to the direction of production 13. During the subsequent closing of the grippers of the pulling device 24, the pulling device 24 is stationary. Subsequently, with the grippers closed, the pulling device 24 is slowly moved forward in the direction of production 13, to be precise approximately in half the time in which the pulling device 24 is closed during a respective movement cycle. The movement described above of the pulling device 24 is repeated for each movement cycle.

The movements of all the other components of the apparatus, to be specific the final reaction region 22, the gel zone region 21, the heating device 19 with the cooled inlet 20, the impregnating device 25, the positioning means 17 and 18 and the positioning means 15 and 16, proceed in accordance with the same pattern of movements, but are phase-shifted—as can be seen from FIG. 2—to be precise with respect to the next-following device, by half the time in which the grippers of the pulling device 24 are opened, are open and are closed (vertical bars of FIG. 2). The final reaction region 22, upstream of the pulling device 24, is stationary while the pulling device 24 is opened, is open and is closed. Once the pulling device 24 is closed, the final reaction region 22 is moved in the direction of production 13, to be precise always approximately less than half the time in which the pulling device 24 is closed. After a brief pause, the final reaction region 22 is then moved back counter to the direction of production 13, to be precise at the same speed and by the same distance as the final reaction region 22 was previously moved forward in the direction of production 13. The same movements are carried out with the same offset in time by the gel zone region 21, the heating device 19 with the cooled inlet 20, the impregnating device 25, the positioning means 17 and 18 and the positioning means 15 and 16.

It is clear from FIG. 2 that the same movements of all the components of the apparatus apart from the pulling device 24 follow one another with an offset in time, but partially overlap one another. The time offset is chosen such that the movement of the positioning means 15 and 16 at the beginning of the apparatus is offset with respect to the movement of the final reaction region by half the time in which the grippers of the pulling device 24 are closed.

As a departure from the representation of FIG. 2, all four positioning means 15 to 18 may also be moved back and forth one after the other independently of one another with a small time offset. It is also conceivable to move only two positioning means, for example the positioning means 15 and 17 or the positioning means 16 and 18, periodically back and forth along the plastic profile 10, while the other two positioning means 15, 17 or 16, 18 are not moved back and forth.

The phased moving back and forth of the individual components of the apparatus, in particular according to FIG. 2, has the effect that individual regions of the reinforcement 11 are alternately subjected to tensile loading or compressive loading, that is to say are compressed. It is also conceivable to perform the periodically successive movements of individual components of the apparatus such that the tensile loading that is exerted on the reinforcement 11 as it passes through the apparatus is entirely or partially reduced periodically from region to region. The tensile loads that are exerted on the reinforcement 11 during the production of the plastic profile 10, changing periodically from region to region, cause a snake-like weaving of the reinforcement 11 through the individual components of the apparatus, whereby the constriction or transverse contraction exerted on the reinforcement during the production of the plastic profile 10 is eliminated, or at least reduced, and as a result the form of the reinforcement 11 does not change during the production of the plastic profile 10 and the position of the reinforcement 11 in the plastic 12 remains unchanged during the production of the plastic profile 10.

A method that differs from this is conceivable, one in which only the pulling device 24 and at least one of the positioning means 15 to 18 are moved periodically back and forth with respect to the direction of production 13. As a result, a periodic portion-by-portion reduction or elimination of the tensile forces exerted on the reinforcement 11 takes place during the production of the plastic profile 10, also periodically allowing spaced-apart compressions to occur in the reinforcement 11. It is also prevented in this way that the reinforcement 11 contracts or is displaced in an undesirable way during the bundling and compression, that is to say upstream of the impregnating device 25 and the mold 23.

Figure 3:
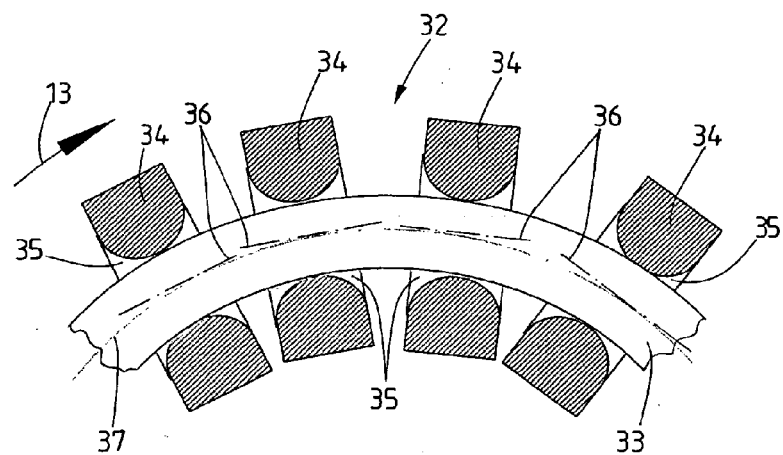
FIG. 3 shows a schematically represented section through a mold for producing an arcuate plastic profile.
Figure 4:
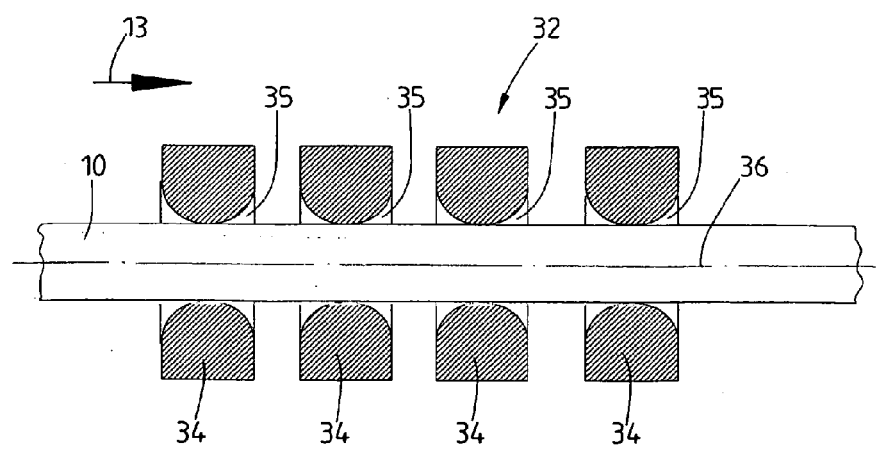
FIG. 4 shows the mold of FIG. 3 in an arrangement for producing a straight plastic profile.

FIGS. 3 and 4 show a further exemplary embodiment of the invention described above. This exemplary embodiment may also constitute an independent invention.

In FIGS. 3 and 4, only part of an apparatus for producing the plastic profile provided with the reinforcement 11 is schematically represented. The part concerned here is a mold 32, which can be changed in its form such that plastic profiles of any desired shapes can be produced with it, to be precise not only the straight plastic profile 10 that is shown in FIG. 4 but also a curved plastic profile 33, which may be both reinforced and unreinforced. Like the plastic 12 of the plastic profile 10, the plastic 12 for the plastic profile 33 may be a thermoset or a thermoplastic.

The mold 32 is formed by multiple mold portions 34 following one another at a distance in the direction of production 13. In the exemplary embodiment shown, the mold 32 consists of four identical mold portions 34, which enclose in one piece the entire circumference of the plastic profile 10, 33 in the manner of a ring. The mold 32 may, however, also have a greater or smaller number of mold portions 34, which may possibly also be differently formed. Each mold portion 34, which in the exemplary embodiment shown is formed in the manner of a plate, is provided with a central molding passage 35. In the present case, all the molding passages 35 are identically formed. However, it is also conceivable that the molding passages 35 of at least some mold portions 34 are differently formed.

The molding passage 35 in each mold portion 34 is provided with a profile or shape that changes in the direction of production 13. In the exemplary embodiment of FIGS. 3 and 4, the narrowest point of each molding passage 35 is in the center of the plate-like mold portion 34. From here, the molding passage 35 widens toward the opposing outer surfaces of the respective mold portion 34, so that the contour of each molding passage 35 is uniformly convex. In FIGS. 3 and 4, the cross section of each molding passage 35 is of an arcuate form, to be precise an approximately semicircular form. However, there may also be other cross sections, for example triangular cross sections, elliptical cross sections or the like. At least at the narrowest point in the center of the mold portion 34 concerned, the molding passage 35 corresponds to the cross section of the plastic profile 10 to be produced.

The fact that the size of each molding passage 35 changes in the longitudinal direction 36 of the respective molding passage 35 means that the circumferential surface of each molding passage 35 is convex. Only in a plane in which the narrowest point of the respective molding passage 35 lies, in the exemplary embodiment shown the center of the respective mold portion 34, is there contact of the molding passage 35 with the outer surface of the plastic profile 10 to be produced. This makes it possible to position the mold portions 34 obliquely in such a way that the longitudinal direction 36 of the molding passage 35 of each mold portion 34 runs in different directions. This allows the production not only of straight plastic profiles 10 but also of a curved plastic profile 33 (FIG. 3). By obliquely positioning the mold portions 34 appropriately, a plastic profile with any desired shape can be produced. The plastic profile may be both two-dimensionally and three-dimensionally curved. In the exemplary embodiment of FIG. 4, all the mold portions 34 of the mold 32 run parallel to one another at a small distance, whereby the longitudinal directions 36 of all the molding passages 35 lie on a common straight line, to be specific the center line of the straight plastic profile 10 to be produced. If, on the other hand, the mold portions 34 are tilted according to the representation in FIG. 3, to be precise preferably to the same extent and in the same direction, the curved plastic profile 33 that is shown in FIG. 3 is produced. Then, the longitudinal directions 36 of the molding passages 35 of the mold portions 34 run tangentially with respect to the longitudinal center axis 37 of the curved plastic profile 33.

With preference, the mold portions 34 are formed from different materials, in order to reduce the friction on the lateral surface or the matrix of the plastic profile 10, 33 to be produced. For example, the first mold portion 34 in the direction of production 13 could be formed from steel, preferably high-grade steel. The then-following mold portion 34 could be formed from copper. The other mold portions 34 may be formed from thermoplastic material, for example polyoxymethylene, or aluminum.

It is also conceivable to cool all or only selected mold portions 34, in particular the mold portions 34 lying downstream in the direction of production 13, and/or to heat at least the first mold portions 34.

The method for producing plastic profiles 10, 33 having any desired shapes proceeds as follows with the mold 32 described above:

Depending on the desired form of the plastic profile 10, 33 to be produced, the mold portions 34 are aligned in relation to one another and fixed. For the production of the straight plastic profile 10, all the mold portions 34 are arranged in relation to one another such that they run parallel to one another, to be precise preferably at equal distances. The longitudinal center axes or longitudinal directions 36 of the molding passages 35 of all the mold portions 34 then lie on a common line, which corresponds to the straight longitudinal center axis 37 of the non-curved plastic profile 10 (FIG. 4).

If, on the other hand, the curved plastic profile 33 is to be produced, preferably all the mold portions 34 are tilted uniformly and in the same direction in relation to one another, to be precise such that the center planes of all the mold portions 34 converge at a common point. In this case, the longitudinal center axes 36 of the molding passages 35 of all the mold portions 34 lie tangentially on the arcuate longitudinal center axis 37 of the plastic profile 33. If the mold portions 34 are tilted multi-axially, three-dimensionally curved plastic profiles can be produced.

It is conceivable that at least one mold portion 34, the first with respect to the direction of production 13, is heated, while at least the last mold portion 34 serves for cooling the plastic profile 10 or 33 to be produced. The mold portions 34 to be cooled may be formed from a material having a relatively smooth and slidable surface, for example an appropriate plastic, but also aluminum, bronze or copper. By contrast, the respectively heated mold portion is formed from a heat-resistant material, for example steel, in particular a chrome-like steel, but possibly also aluminum, copper or bronze.

LIST OF DESIGNATIONS 10 plastic profile
11 reinforcement
12 plastic
13 direction of production
14 positioning device
15 positioning means
16 positioning means
17 positioning means
18 positioning means
19 heating device
20 cooled inlet
21 gel zone region
22 final reaction region
23 mold
24 pulling device
25 impregnating device
26 discharge device
27 discharge device
28 passage
29 passage
30 passage
31 passage
32 mold
33 plastic profile
34 mold portion
35 molding passage
36 longitudinal direction
37 longitudinal center axis

What is claimed is:
1. A method for producing a plastic profile (10, 33) having a reinforcement (11), comprising:

passing a reinforcement (11) uninterruptedly through a positioning device (14) and a mold (23, 32) in a direction of production (13), the positioning device having at least two successive, separate positioning means (15, 16, 17, 18);

pulling the reinforcement (11) through the positioning device (14) and the mold (23, 32) in the direction of production (13) using a pulling device (24);

periodically moving at least one of the positioning means (15, 16, 17, 18) back and forth in the direction of production (13) and counter to the direction of production (13) in relation to at least one other of the positioning means (15, 16, 17, 18);

periodically changing the distance between at least two of the positioning means (15, 16, 17, 18) following one another and moving in the direction of production (13); and embedding the reinforcement (11) in a plastic material within the mold (23, 32) thereby producing the plastic profile (10, 33) having a reinforcement (11);

whereby the reinforcement (11) is positioned in the plastic material within the mold as a result of the movement of the at least one of the positioning means (15, 16, 17, 18) in relation to the at least one other of the positioning means (15, 16, 17, 18).

2. The method as claimed in claim 1, wherein the positioning means (15, 16, 17, 18) surround the reinforcement (11).

3. The method as claimed in claim 1, further comprising keeping the reinforcement (11) taut as it is pulled through at least the positioning means (15, 16, 17, 18).

4. The method as claimed in claim 1, wherein the plastic profile (10, 33) is cooled and/or radially pressed together or calibrated in the pulling device (24).

5. The method as claimed in claim 1, further comprising releasing the pulling device (24) from a circumference of the plastic profile (10, 33).

6. The method as claimed in claim 1, further comprising periodically moving back and forth a component selected from the group consisting of at least one of an impregnating device (25), the mold (23, 32), and the pulling device (24).

7. The method as claimed in claim 3, wherein the keeping taut of the reinforcement (11) takes place between a first one of the positioning means (15) in the direction of production (13) and the pulling device (24).

8. The method as claimed in claim 5, wherein the pulling device (24) is released from the circumference of the plastic profile (10, 33) by dividing the pulling device (24).

9. The method as claimed in claim 1, further comprising periodically moving back and forth a component selected from the group consisting of at least one of the positioning means (15, 16, 17, 18), an impregnating device (25), the mold (23, 32), and the pulling device (24), in a phase-offset or phase-shifted manner.

10. The method as claimed in claim 2, wherein the reinforcement (11) comprises a plurality of strands, wherein the positioning means (15, 16, 17, 18) surround the reinforcement (11), and wherein the positioning means (15, 16, 17, 18) reduce a circumference or a cross section of the strands of the reinforcement (11) in the direction of production.

11. The method as claimed in claim 10, wherein the circumference or the cross section of the reinforcement (11) is reduced stage by stage.

* * * * *